(12) United States Patent
Vetter et al.

(10) Patent No.: US 9,463,880 B2
(45) Date of Patent: Oct. 11, 2016

(54) METHOD AND SYSTEM OF MAKING COMPOSITE STRUCTURES HAVING GAP FILLERS WITH CHOPPED FIBER MATERIAL

(71) Applicant: The Boeing Company, Chicago, IL (US)

(72) Inventors: Derek P. Vetter, Olympia, WA (US); Michael J. Graves, Seattle, WA (US); Kenneth H. Griess, Kent, WA (US)

(73) Assignee: The Boeing Company, Chicago, IL (US)

( * ) Notice: Subject to any disclaimer, the term of this patent is extended or adjusted under 35 U.S.C. 154(b) by 381 days.

(21) Appl. No.: 13/762,339

(22) Filed: Feb. 7, 2013

(65) Prior Publication Data

US 2014/0216638 A1    Aug. 7, 2014

(51) Int. Cl.
*B29C 70/02*  (2006.01)
*B64F 5/00*   (2006.01)
*B29D 99/00*  (2010.01)
(Continued)

(52) U.S. Cl.
CPC .......... *B64F 5/0009* (2013.01); *B29C 70/081* (2013.01); *B29D 99/0003* (2013.01); *B29D 99/0014* (2013.01); *B29K 2105/14* (2013.01); *Y02T 50/433* (2013.01); *Y10T 156/1051* (2015.01)

(58) Field of Classification Search
CPC ..... B29C 70/30; B29C 70/08; B29C 70/081; B29D 99/00; B29D 99/0014; B29D 99/0003; B64F 5/0009

USPC ........ 156/227, 276, 286, 382, 390, 443, 475
See application file for complete search history.

(56) References Cited

U.S. PATENT DOCUMENTS 3,291,672 A * 12/1966 Sonneborn ............ B29B 15/122
                                                   156/275.5
5,239,822 A *  8/1993 Buchacher ............ B64D 29/00
                                                   244/110 B
6,436,507 B1   8/2002 Pannell
(Continued)

FOREIGN PATENT DOCUMENTS

CN    101445663 B    1/2012
WO    WO2010/144007 A1   12/2010
WO    WO2011/023322 A1   3/2011

OTHER PUBLICATIONS

European Patent Office Extended European Search Report for Counterpart Patent Application No. EP14153701.9-1703, Applicant The Boeing Company, dated Jun. 10, 2014, 4 pages.

(Continued)

*Primary Examiner* — Michael N Orlando
*Assistant Examiner* — Elizabeth Bradford

(57) ABSTRACT

There is provided in an embodiment a method of making a composite structure. The method includes the step of applying chopped fiber material in varying thicknesses onto a first ply surface of a first composite charge to form a layered composite charge. The method further includes the step of folding the layered composite charge. The method further includes the step of assembling a second composite charge and the folded layered composite charge to form a composite structure. The chopped fiber material forms a gap filler in the composite structure. The gap filler conforms to a shape of the composite structure surrounding the gap filler. The method further includes processing the composite structure.

19 Claims, 10 Drawing Sheets

(51) Int. Cl.
  *B29C 70/08* (2006.01)
  *B29K 105/14* (2006.01)

(56) References Cited

U.S. PATENT DOCUMENTS

| | | | |
|---|---|---|---|
| 6,562,436 B2 | 5/2003 | George et al. | |
| 6,689,448 B2 | 2/2004 | George et al. | |
| 6,709,538 B2 | 3/2004 | George et al. | |
| 6,814,916 B2 | 11/2004 | Willden et al. | |
| 6,848,312 B2 | 2/2005 | Georgeson | |
| 7,531,058 B2 | 5/2009 | Grose et al. | |
| 8,084,114 B2 | 12/2011 | Grose et al. | |
| 2004/0265536 A1* | 12/2004 | Sana | B29B 70/345 428/119 |
| 2009/0127393 A1 | 5/2009 | Guzman et al. | |

OTHER PUBLICATIONS

Canadian Intellectual Property Office (CIPO) First Office Action, dated May 4, 2015, for counterpart Canadian Patent Application No. 2,838,357, Applicant The Boeing Company, 4 pages.

* cited by examiner

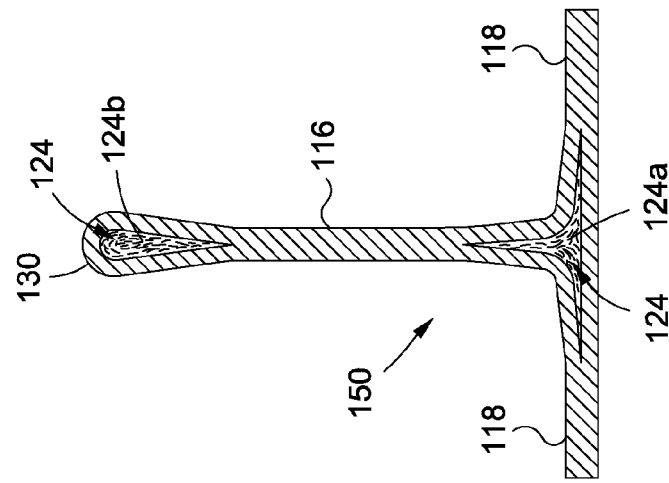
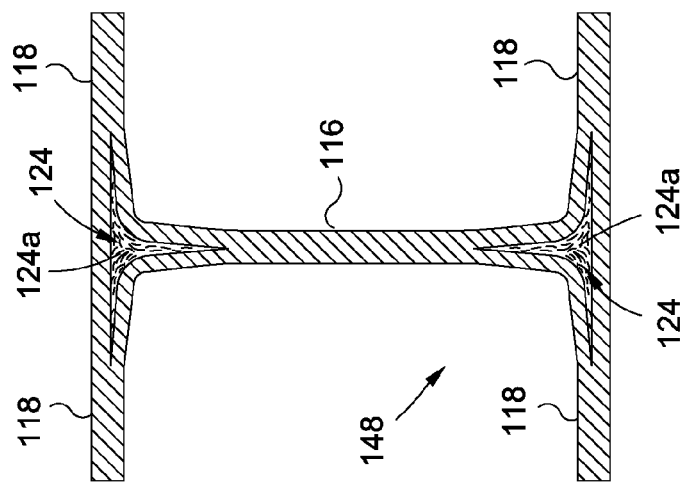
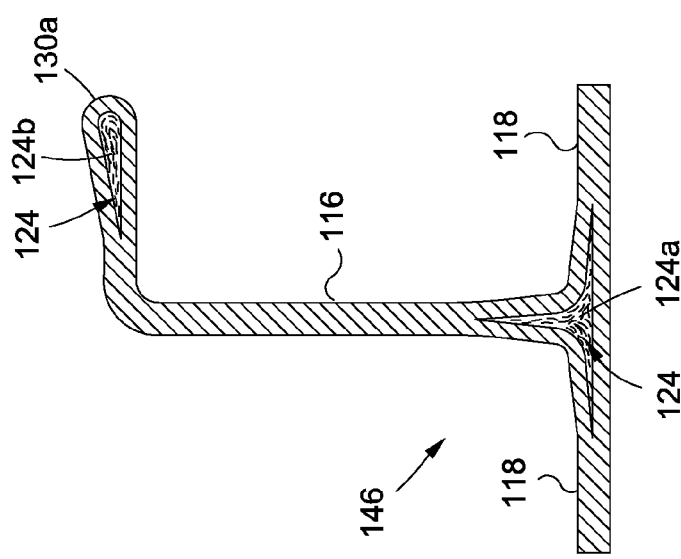

METHOD AND SYSTEM OF MAKING COMPOSITE STRUCTURES HAVING GAP FILLERS WITH CHOPPED FIBER MATERIAL

BACKGROUND

1) Field of the Disclosure

The disclosure relates generally to methods and systems of making composite structures, and more specifically, to methods and systems of making composite structures having gap fillers, such as stringer composite structures in aircraft wings.

2) Description of Related Art

Composite structures are used in a wide variety of applications, including in the manufacture of aircraft, spacecraft, rotorcraft, watercraft, automobiles, trucks, and other vehicles and structures, due to their high strength-to-weight ratios, corrosion resistance, and other favorable properties. In aircraft construction, composites structures are used in increasing quantities to form the wings, fuselage, tail sections, and other components.

For example, aircraft wings may be formed of composite stiffened panel structures comprising composite skin panels or webs to which reinforcing stiffeners or "stringers" may be attached or bonded to improve the strength, stiffness, buckling resistance, and stability of the composite skin panels or webs. The stringers attached or bonded to the composite skin panels or webs may be configured to carry various loads and may be provided in a variety of different cross-sectional shapes, such as T-stiffeners, J-stiffeners, and I-beams.

Known stringers found in aircraft composite wing structures may have a low pull-off strength. Consequently, such stringers may not be loaded through a stringer blade portion. This may require that holes be drilled in the wing skin and that fasteners be attached through the wing skin to attach, for example, wing rib fittings to the wing skin. However, this may create additional areas on the aircraft subject to possible fuel leaks or manufacturing issues and complications. Moreover, such fasteners may need to be treated and triple protected for lightening strike protection, and such fastener holes may require liquid tight sealing so that they are not subject to fuel leaks. For example, such fasteners protruding into a fuel cell in the wing may need to be countersunk, coated on the outside with an insulating plug, coated on the inside with an insulating sealant, and grounded to prevent sparking inside of the fuel cell. The time required for installing such fasteners may be increased, which, in turn, may increase manufacturing complexity and cost. In addition, the presence of additional fasteners may add weight to the aircraft, which, in turn, may reduce the payload capacity of the aircraft and may increase fuel consumption, which may result in increased fuel costs.

Gaps or void regions may be formed by the radius of curved portions of the stringers when they are attached or joined perpendicularly to composite skin panels or webs. Such gaps or void regions may typically be referred to as "gap or radius filler regions" or "noodle regions". Such gap or radius filler regions or noodle regions within stringers may be prone to cracking because they may be three-dimensionally constrained. Gap or radius fillers or "noodles" made of composite material or adhesive/epoxy material and having a generally triangular cross-section may be used to fill the gap or radius filler regions or noodle regions in order to provide additional structural reinforcement to such regions. However, known gap or radius fillers or noodles may be made of a material that is different from or not compatible with the material of the composite structure surrounding the gap or radius filler or noodle. This may result in different material properties which may, in turn, require modifications to cure cycles, processing temperatures and pressures, and/or relative amounts of fibers and resin matrices. Such modifications may increase manufacturing time, labor and costs.

In addition, known gap or radius fillers or noodles may be very long in length (e.g., 60-80 feet long), thin and fragile. Consequently, such gap or radius fillers or noodles may be difficult to store and transport and may require increased labor and costly storage and transport means to avoid or minimize damage to such gap or radius fillers or noodles.

Further, known unidirectional/laminate gap or radius fillers or noodles may have relatively blunt tips on the three corners of the gap or radius filler or noodle. A zero degree (0°) ply of pre-preg (i.e., reinforcement fibers impregnated with a resin material) may be folded over itself repeatedly to form a circular gap or radius filler or noodle. The gap or radius filler or noodle may then be formed into a triangular shape under heat and vacuum. The blunt noodle tip may create resin rich pockets at the tips of the gap or radius filler or noodle and such regions may be susceptible to initiation of crack propagation. The crack may spread between composite plies and the crack may cause premature stringer pull-off strength issues. A low pull-off strength may prevent the stringers from being used as structural attachment points inside the wing box. This, in turn, may require, as discussed above, that holes be drilled in the wing skin and that fasteners be attached through the wing skin to attach wing rib fittings to the wing skin.

Accordingly, there is a need in the art for improved methods and systems of making composite structures having gap or radius fillers or noodles that provide advantages over known methods, systems and structures.

SUMMARY

This need for improved methods and systems of making composite structures having gap or radius fillers or noodles is satisfied. As discussed in the below detailed description, embodiments of the improved methods and systems of making composite structures having gap or radius fillers or noodles may provide significant advantages over known methods, systems and structures.

In one embodiment of the disclosure, there is provided a method of making a composite structure. The method comprises the step of applying chopped fiber material in varying thicknesses onto a first ply surface of a first composite charge to form a layered composite charge. The method further comprises the step of folding the layered composite charge. The method further comprises the step of assembling a second composite charge and the folded layered composite charge to form a composite structure. The chopped fiber material forms a gap filler in the composite structure. The gap filler conforms to a shape of the composite structure surrounding the gap filler. The method further comprises the step of processing the composite structure.

In another embodiment of the disclosure, there is provided a method of making a composite structure having one or more gap fillers and one or more interlaminar layers. The method comprises the step of applying a chopped fiber gap filler layer comprising chopped fiber material in varying thicknesses onto a first carrier layer comprising a composite fabric. The method further comprises the step of forming a layered composite charge by stacking the first carrier layer with a plurality of composite plies to obtain a first composite charge, the first carrier layer being positioned between the chopped fiber gap filler layer and the first composite charge. The method further comprises the step of stacking a second carrier layer comprising a composite fabric with a plurality of composite plies to obtain a second composite charge. The method further comprises the step of assembling the layered composite charge and the second composite charge to form a composite structure. The chopped fiber material forms in the composite structure one or more gap fillers and one or more interlaminar layers. The chopped fiber material comprises a same material as a material comprising the composite structure or comprises a material compatible with the material comprising the composite structure. The method further comprises the step of processing the composite structure.

In another embodiment of the disclosure, there is provided a system for making a composite structure. The system comprises a layered composite charge. The layered composite charge comprises a first composite charge comprising a plurality of first stacked composite plies and having a first ply surface. The layered composite charge further comprises a chopped fiber gap filler layer applied to the first ply surface. The chopped fiber gap filler layer comprises chopped fiber material in varying thicknesses. The system further comprises a composite material processing assembly adapted to fold the layered composite charge. The system further comprises a second composite charge comprising a plurality of second stacked composite plies. The second composite charge is assembled with the folded layered composite charge to form a composite structure. The system further comprises at least one gap filler formed in the composite structure. The gap filler is formed of the chopped fiber material comprising a same material as or a compatible material with a material comprising the composite structure surrounding the gap filler. The gap filler is quasi-isotropic and conforms to a shape of the composite structure surrounding the gap filler. The system further comprises at least one interlaminar layer formed in the composite structure. The interlaminar layer is formed of the chopped fiber material. The system further comprises a vacuum bag assembly and a curing apparatus for processing the composite structure.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 10A is an illustration of a front sectional view of an embodiment of a J-shaped stringer that may be made with one of the embodiments of a system and a method of the disclosure;

FIG. 10B is an illustration of a front sectional view of an embodiment of an I-shaped stringer that may be made with one of the embodiments of a system and a method of the disclosure;

FIG. 10C is an illustration of a front sectional view of an embodiment of a bulb-shaped stringer that may be made with one of the embodiments of a system and a method of the disclosure;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and will fully convey the scope of the disclosure to those skilled in the art.

Figure 1:
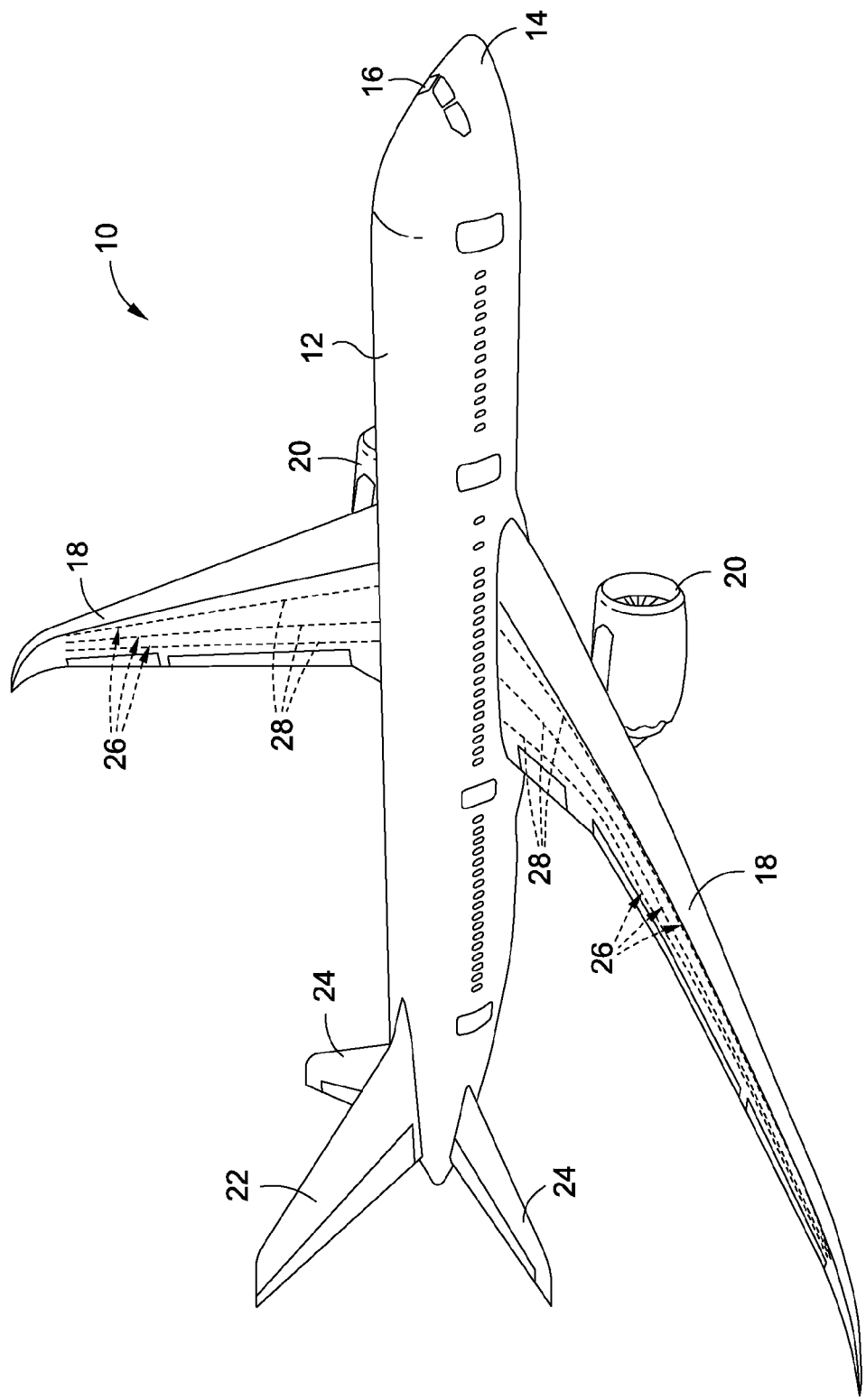
FIG. 1 is an illustration of a perspective view of an exemplary aircraft that may incorporate one or more composite structures having a gap filler that may be made with one or more embodiments of a system and a method of the disclosure.

Now referring to the Figures, FIG. 1 is an illustration of a perspective view of an exemplary aircraft 10 that may incorporate one or more composite structures 26 having a gap filler 124 (see FIG. 8) with chopped fiber material 72 (see FIG. 4A) that may be made with one or more embodiments of a system 68 (see FIG. 13) and a method 200 (see FIG. 14) disclosed herein. As shown in FIG. 1, the aircraft 10 comprises a fuselage 12, a nose 14, a cockpit 16, wings 18, one or more propulsion units 20, a vertical tail portion 22, and horizontal tail portions 24. As shown in FIG. 1, the composite structures 26 may comprise stringers 28 in wings 18. Although the aircraft 10 shown in FIG. 1 is generally representative of a commercial passenger aircraft having one or more composite structures 26, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles, as well as boats and other watercraft, trains, automobiles, trucks, buses, or other suitable structures having one or more composite structures 26 having a gap filler 124 (see FIG. 8) with chopped fiber material 72 (see FIG. 4A) and that may be made with one or more embodiments of the system 68 (see FIG. 13) and the method 200 (see FIG. 14) disclosed herein.

Figure 2:
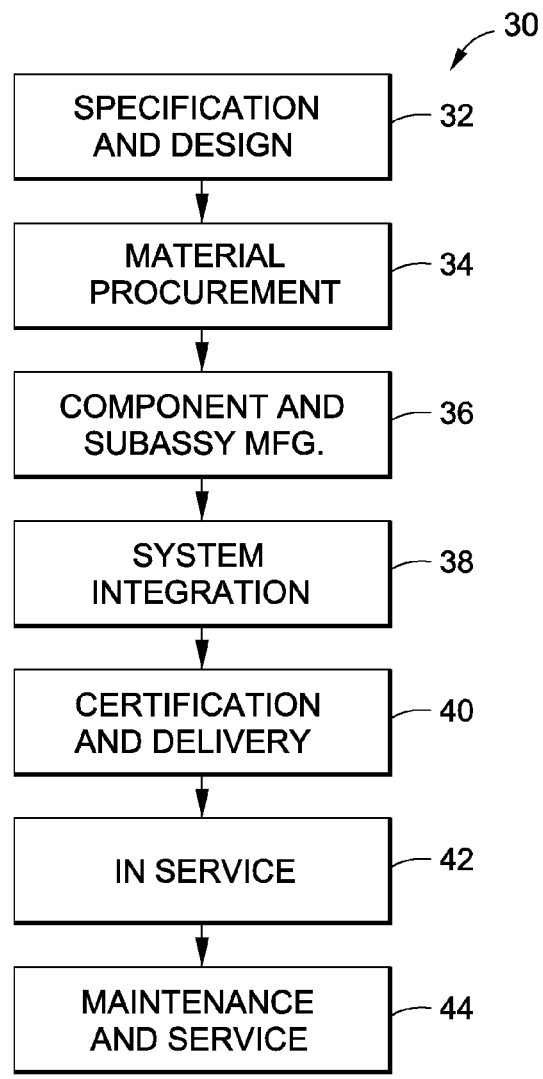
FIG. 2 is an illustration of a flow diagram of an aircraft production and service method.
Figure 3:
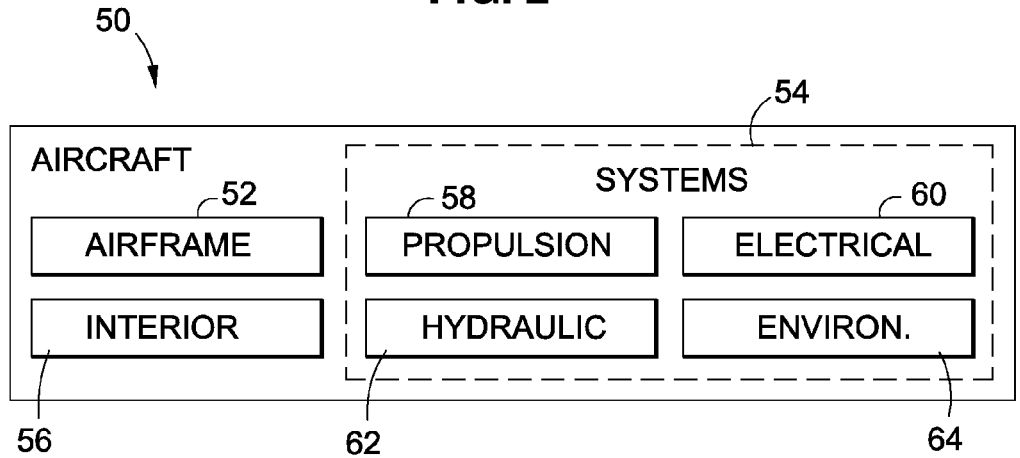
FIG. 3 is an illustration of a functional block diagram of an aircraft.

FIG. 2 is an illustration of a flow diagram of an aircraft production and service method 30. FIG. 3 is an illustration of a functional block diagram of an aircraft 50. Referring to FIGS. 2-3, embodiments of the disclosure may be described in the context of the aircraft manufacturing and service method 30 as shown in FIG. 2 and the aircraft 50 as shown in FIG. 3. During pre-production, exemplary method 30 may include specification and design 32 of the aircraft 50 and material procurement 34. During production, component and subassembly manufacturing 36 and system integration 38 of the aircraft 50 takes place. Thereafter, the aircraft 50 may go through certification and delivery 40 in order to be placed in service 42. While in service 42 by a customer, the aircraft 50 may be scheduled for routine maintenance and service 44 (which may also include modification, reconfiguration, refurbishment, and other suitable services).

Each of the processes of method 30 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and other suitable operators.

As shown in FIG. 3, the aircraft 50 produced by exemplary method 30 may include an airframe 52 with a plurality of systems 54 and an interior 56. Examples of high-level systems 54 may include one or more of a propulsion system 58, an electrical system 60, a hydraulic system 62, and an environmental system 64. Any number of other systems may be included. Although an aerospace example is shown, the principles of the invention may be applied to other industries, such as the automotive industry.

Methods and systems embodied herein may be employed during any one or more of the stages of the production and service method 30. For example, components or subassemblies corresponding to component and subassembly manufacturing 36 may be fabricated or manufactured in a manner similar to components or subassemblies produced while the aircraft 50 is in service. Also, one or more apparatus embodiments, method embodiments, or a combination thereof, may be utilized during component and subassembly manufacturing 36 and system integration 38, for example, by substantially expediting assembly of or reducing the cost of the aircraft 50. Similarly, one or more of apparatus embodiments, method embodiments, or a combination thereof, may be utilized while the aircraft 50 is in service, for example and without limitation, to maintenance and service 44.

Figure 4A:
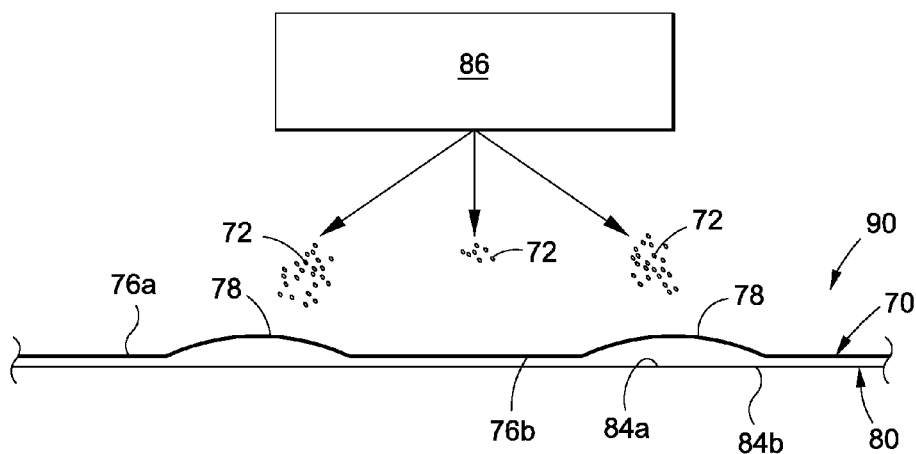
FIG. 4A is an illustration of a front schematic view of a layered composite charge that may be used in one of the embodiments of a system and a method of the disclosure.
Figure 13:
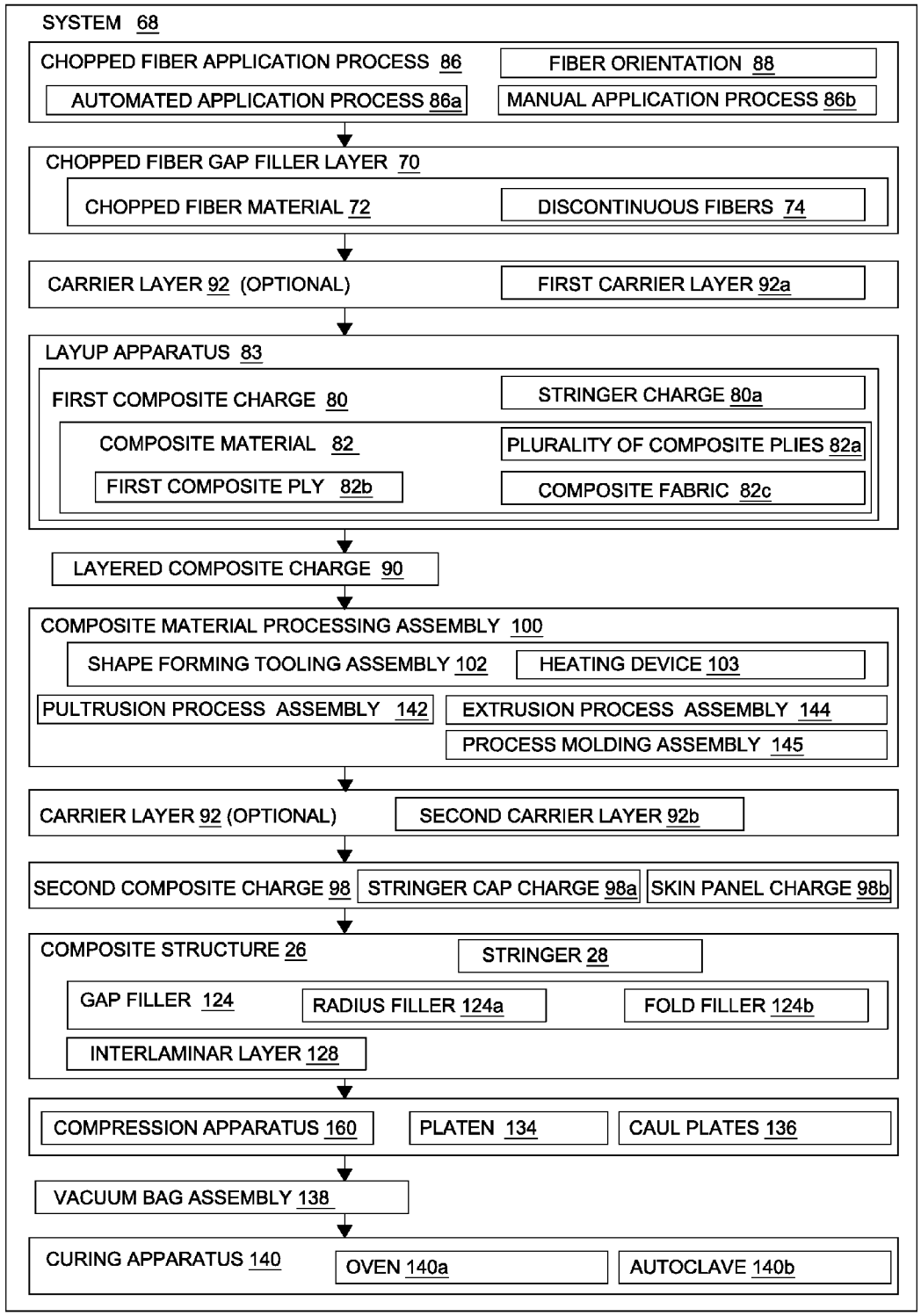
FIG. 13 is an illustration of a functional block diagram of an exemplary embodiment of a system of the disclosure; and, FIG. 14 is an illustration of a flow diagram of an exemplary embodiment of a method of the disclosure.

In one embodiment of the disclosure, there is provided a system 68 for making a composite structure 26 (see FIG. 1, FIG. 8, FIG. 13) having a gap filler 124 (see FIG. 8) formed with chopped fiber material 72 (see FIG. 4A). FIG. 13 is an illustration of a functional block diagram of an exemplary embodiment of the system 68 of the disclosure.

Figure 14:
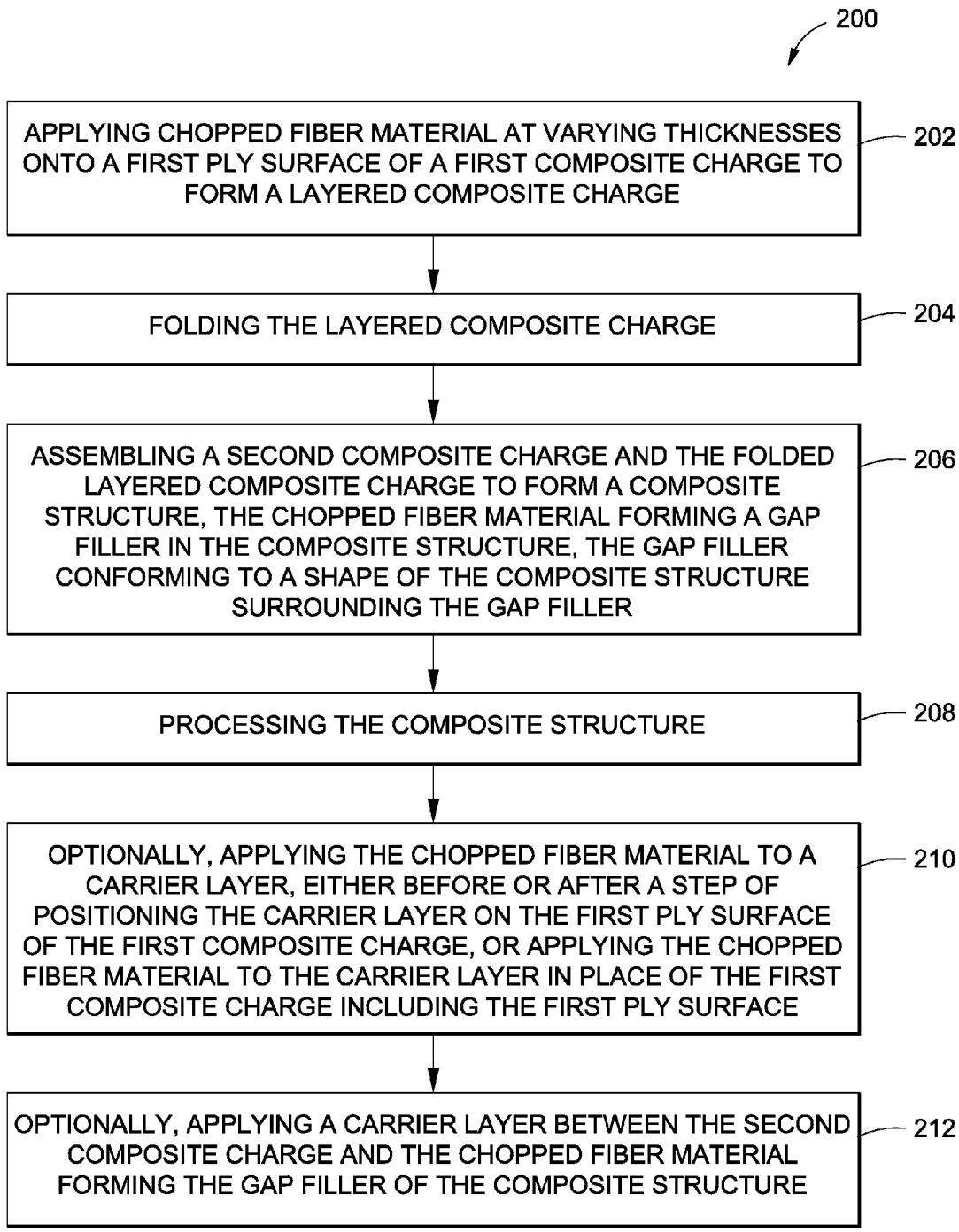

In another embodiment of the disclosure, there is provided a method 200 of making a composite structure 26 (see FIG. 1, FIG. 8 and FIG. 13) having a gap filler 124 (see FIG. 8 and FIG. 13) formed with chopped fiber material 72 (see FIG. 4A). FIG. 14 is an illustration of a flow diagram of an exemplary embodiment of the method 200 of the disclosure.

As shown in FIGS. 4A and 13, the system 68 comprises a layered composite charge 90. FIG. 4A is an illustration of a front schematic view of the layered composite charge 90 that may be used in one of the embodiments of the system 68 and the method 200 of the disclosure. The layered composite charge 90 comprises a first composite charge 80 (see FIG. 4A). The first composite charge 80 is preferably made of a composite material 82 (see FIGS. 4B and 13) and preferably comprises a plurality of composite plies 82a (see FIG. 13), such as a plurality of first stacked composite plies that may be stacked or laid up using a layup apparatus 83 (see FIG. 13). The first composite charge 80 further comprises a first composite ply 82b (see FIG. 13) having a first ply surface 84a (see FIG. 4A). The first composite charge 80 further comprises a second surface 84b (see FIG. 4A). The first composite charge 80 preferably comprises a stringer charge 80a (see FIGS. 4B, 4D).

The plurality of composite plies 82a (see FIG. 13) may preferably be formed from a reinforcement material surrounded by and supported within a matrix material, such as for example, a pre-preg material. The reinforcement material may comprise high-strength fibers, such as glass or carbon fibers, graphite, aromatic polyamide fiber, fiberglass, or another suitable reinforcement material. The matrix material may comprise thermoplastic or thermoset polymeric resins. Exemplary thermosetting resins may include allyls, alkyd polyesters, bismaleimides (BMI), epoxies, phenolic resins, polyesters, polyurethanes (PUR), polyurea-formaldehyde, cyanate ester, and vinyl ester resin. Exemplary thermoplastic resins may include ceramics; liquid-crystal polymers (LCP); fluoroplastics, including polytetrafluoroethylene (PTFE), fluorinated ethylene propylene (FEP), perfluoroalkoxy resin (PFA), polychlorotrifluoroethylene (PCTFE), and polytetrafluoroethylene-perfluoromethylvinylether (MFA); ketonebased resins, including polyetheretherketone; polyamides such as nylon-6/6, 30% glass fiber; polyethersulfones (PES); polyamideimides (PAIS), polyethylenes (PE); polyester thermoplastics, including polybutylene terephthalate (PBT), polyethylene terephthalate (PET), and poly(phenylene terephthalates); polysulfones (PSU); or poly(phenylene sulfides) (PPS).

As used herein, "pre-preg" means a woven or braided fabric or cloth-like tape material, e.g., fiberglass or carbon fibers, that have been impregnated with an uncured or partially cured resin, which is flexible enough to be formed into a desired shape, then "cured," e.g., by the application of heat in an oven or an autoclave, to harden the resin into a strong, rigid, fiber-reinforced structure. The plurality of composite plies 82a may be in the form of a pre-preg unidirectional tape, a unidirectional fiber tape, a carbon fiber-reinforced plastic (CFRP) tape, or another suitable tape; a carbon fiber-reinforced plastic (CFRP) fabric, a pre-preg fabric, a woven fabric including a woven carbon fiber fabric, or another suitable fabric; a combination of a tape or a fabric thereof; or another suitable composite material. Embodiments of the gap filler 124 preferably increase a pull-off load and enhance a pull-off strength. As used herein, "pull-off load" means a shear load and/or moment force applied to a composite structure, such as a stringer, at locations where the composite structure is attached or bonded to another composite structure, such as a composite skin panel or web, such that the shear load and/or moment force may cause delamination or separation of the reinforcing stiffener from the attached composite structure.

The materials used for the composite structure 26 may be selected, at least in part, according to the intended use of the composite structure 26, as a structural panel for an aircraft 10, or other aerospace structures, automobiles, marine vehicles, other vehicles, buildings and other structures, and the like.

As further shown in FIGS. 4A and 13, the layered composite charge 90 further comprises a chopped fiber gap filler layer 70 applied to the first ply surface 84a. As shown in FIG. 4A, the chopped fiber gap filler layer 70 has a first surface 76a and a second surface 76b. The chopped fiber gap filler layer 70 preferably comprises chopped fiber material 72 (see FIG. 4A), such as a chopped carbon fiber material. The chopped fiber material 72 may more preferably comprise a pre-preg carbon fiber material with chopped long fiber, thin flake elements of varying sizes and shapes. The chopped fiber material may be pre-impregnated with a thermoset resin material that interfaces well with stringer charge and skin panel charge materials, or may be used with a suitable thermoplastic resin.

Figure 4C:
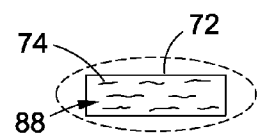
FIG. 4C is an illustration of an enlarged view of chopped fiber material shown in circle 4C of FIG. 4B.
Figure 8:
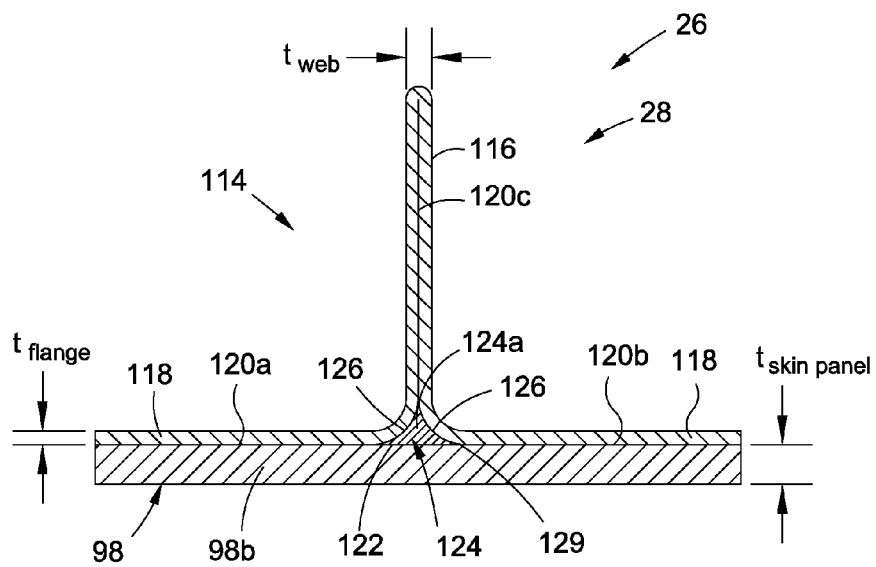
FIG. 8 is an illustration of a front sectional view of an embodiment of a composite structure that may be made with one of the embodiments of a system and a method of the disclosure.
Figure 9:
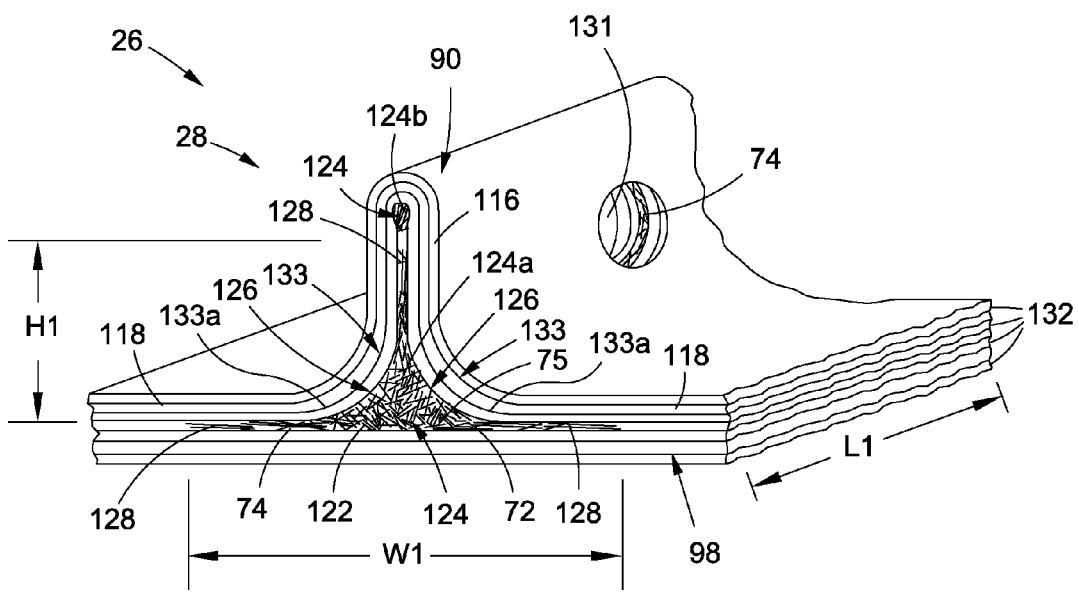
FIG. 9 is an illustration of a perspective view of another embodiment of a composite structure that may be made with one of the embodiments of a system and a method of the disclosure.

The chopped fiber material 72 creates a gap filler 124 (see FIG. 8) that is a quasi-isotropic material 75 (see FIG. 9). Preferably, the chopped fiber material 72 is applied to the first ply surface 84a in varying thicknesses, such as thickness $t_1$ (see FIG. 4B) and thickness $t_2$ (see FIG. 4B) or another suitable varying or variable thickness. The chopped fiber material 72 preferably comprises discontinuous fibers 74 (see FIG. 4C). FIG. 4C is an illustration of an enlarged view of the chopped fiber material 72 shown in circle 4C of FIG. 4B. The chopped fiber material 72 is preferably steered onto the first ply surface 84a of the first composite charge 80, such that a substantial number of discontinuous fibers 74 (see FIG. 4C) of the chopped fiber material 72 are steered in a desired fiber orientation 88 (see FIG. 4C and FIG. 13). The desired fiber orientation 88 may comprise an advantageous direction in any axis, for example, the fibers may be oriented in an x-axis direction, in a y-axis direction, or in a z-axis direction, such as a lengthwise orientation, an orientation perpendicular to the length where when the stringer 28 is formed it may fold over the radius portions 126 of the radius filler 124a or noodle. The orientation of the discontinuous, chopped fiber material 72 may be more easily steered or controlled than continuous fibers or continuous fiber material.

The chopped fiber material 72 may preferably be applied to the first ply surface 84a of the first composite charge 80 via a chopped fiber application process 86 (see FIG. 4A and FIG. 13). The chopped fiber application process 86 may comprise an automated application process 86a (see FIG. 13), such as an automated application process using a robotic arm, an automated pressurized spraying device, or another suitable device or apparatus, that has the capability of depositing or spraying the chopped fiber material 72 along the length of the first ply surface 84a of the first composite charge 80 in varying thicknesses. The chopped fiber application process 86 may further comprise a manual application process 86b (see FIG. 13), such as an operator applying the chopped fiber material 72 by hand, with a chopper gun, or via another suitable manually operated device that has the capability of depositing or spraying the chopped fiber material 72 along the length of the first ply surface 84a of the first composite charge 80 in varying thicknesses. FIG. 4A shows the chopped fiber material 72 being applied or deposited via the chopped fiber application process 86 onto the first ply surface 84a of the first composite charge 80. The first composite charge 80 is preferably substantially flat when the chopped fiber material 72 is being applied.

Figure 4B:
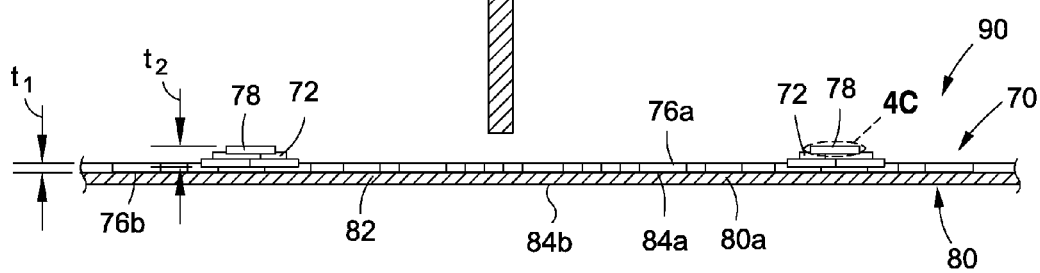
FIG. 4B is an illustration of a front partial sectional view of an embodiment of a layered composite charge that may be used in one of the embodiments of a system and a method of the disclosure and that shows the layered composite charge positioned under a shape forming tooling assembly.

FIG. 4B is an illustration of a front partial sectional view of an embodiment of the layered composite charge 90 that may be used in one of the embodiments of the system 68 and the method 200 of the disclosure and that shows the layered composite charge 90 positioned under a composite material processing assembly 100, such as in the form of a shape forming tooling assembly 102. As shown in FIG. 4A, the chopped fiber material 72 is preferably applied or deposited onto the first ply surface 84a of the first composite charge 80 in at least two mound portions 78 (see also FIG. 4A). Each mound portion 78 is preferably of a sufficient thickness $t_2$ to form the gap filler 124 (see FIG. 7A) and to fill a gap filler region 122 (see FIG. 8) of the composite structure 26.

As shown in FIG. 4B, the first composite charge 80, such as in the form of stringer charge 80a, will preferably have the chopped fiber material 72, such as in the form of chopped carbon fiber material, applied to the first ply surface 84a of the first composite charge 80, in varying thicknesses using a chopped fiber application process 86 (see FIG. 4A), such as a spraying technique, prior to forming the composite structure 26, such as the stringer 28 (see FIG. 1). An automated application process 86a (see FIG. 13), such as use of a robot and a robotic arm may be used to apply the chopped fiber material 72. The robot preferably provides consistent fiber randomness and adequate chopped fiber material 72 thickness control across the first composite charge 80. The chopped fiber material 72, such as in the form of chopped carbon fiber pre-preg material, is preferably applied with sufficient thickness for the gap filler region 122 (see FIG. 8) of the composite structure 26 to be filled once the chopped fiber material 72 is heated up and formed into the shape of the composite structure 26, such as the shape of the stringer 28. A thin layer of chopped fiber material 72, such as in the form of chopped carbon fiber material, is preferably used throughout the first composite charge 80, such as the stringer charge 80a (see FIG. 4B), so as to not create hard tip portions 129 (see FIG. 8) for the gap filler 124 once the layered composite charge 90 (see FIG. 4B) is formed.

Figure 4D:
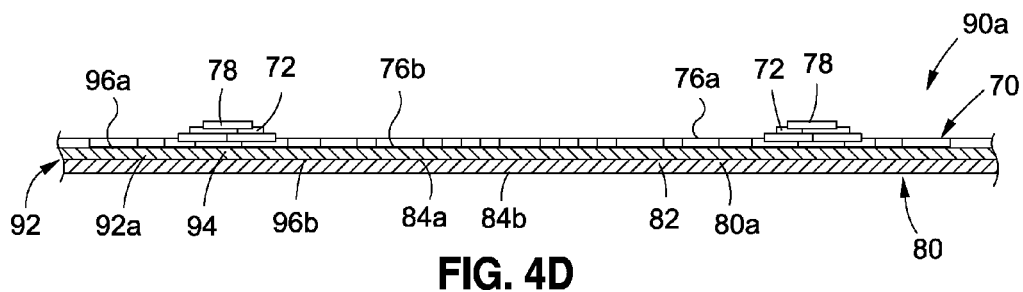
FIG. 4D is an illustration of a front partial sectional view of another embodiment of a layered composite charge with a carrier layer that may be used in one of the embodiments of a system and a method of the disclosure.

FIG. 4D is an illustration of a front partial sectional view of another embodiment of a layered composite charge 90a with a carrier layer 92, or veil layer, that may be used in one of the embodiments of the system 68 and the 200 method of the disclosure. As shown in FIG. 4D, the carrier layer 92 may comprise a first surface 96a and a second surface 96b. The carrier layer 92 preferably comprises a composite fabric 82c (see FIG. 13), such as a loose carbon fiber woven fabric, that may be used on the interfacing surfaces between the first composite charge 80 and the chopped fiber gap filler layer 70. This allows for a consistent surface transition from the chopped fiber material 72 back to a tape material.

As further shown in FIG. 4D, the carrier layer 92, such as in the form of a first carrier layer 92a (see FIG. 4D), may be positioned between the first ply surface 84a of the first composite charge 80 and second surface 76b of the chopped fiber gap filler layer 70. The first surface 96a of the carrier layer 92, such as in the form of first carrier layer 92a, may interface with the second surface 76b of the chopped fiber gap filler layer 70, and the second surface 96b of the carrier layer 92, such as in the form of first carrier layer 92a, may interface with the first ply surface 84a of the first composite charge 80.

In one embodiment, the chopped fiber material 72 may be applied to the carrier layer 92 (see FIG. 4D), such as in the form of a first carrier layer 92a (see FIG. 4D), either before or after a step of positioning the carrier layer 92 on the first ply surface 84a (see FIG. 4D) of the first composite charge 80. For example, the carrier layer 92 may be positioned on the first ply surface 84a of the first composite charge 80 and then the chopped fiber material 72 may be applied to the carrier layer 92.

In another embodiment, the chopped fiber material 72 may be applied to the carrier layer 92 in place of or instead of the first composite charge 80, including the first ply surface 84a of the first composite charge 80. For example, the chopped fiber material 72 may be applied to the carrier layer 92 at a separate location and then the carrier layer 92 with the chopped fiber material 72 may be transported or transferred to the first composite charge 80 and positioned on the first ply surface 84a of the first composite charge 80. In this embodiment, the chopped fiber material 72 may be applied to the carrier layer 92 to form a layered carrier layer which may then be folded, assembled with the second composite charge 98 to form the composite structure 26, and then processed.

In another embodiment of the disclosure, the chopped fiber gap filler layer 70 may be applied onto the first carrier layer 92a (see FIG. 4D) The first carrier layer 92a may then be stacked with a plurality of composite plies 82a (see FIG. 13) to obtain the first composite charge 80, with the carrier layer 92a being positioned between the chopped fiber gap filler layer 70 and the first composite charge 80.

Figure 5:
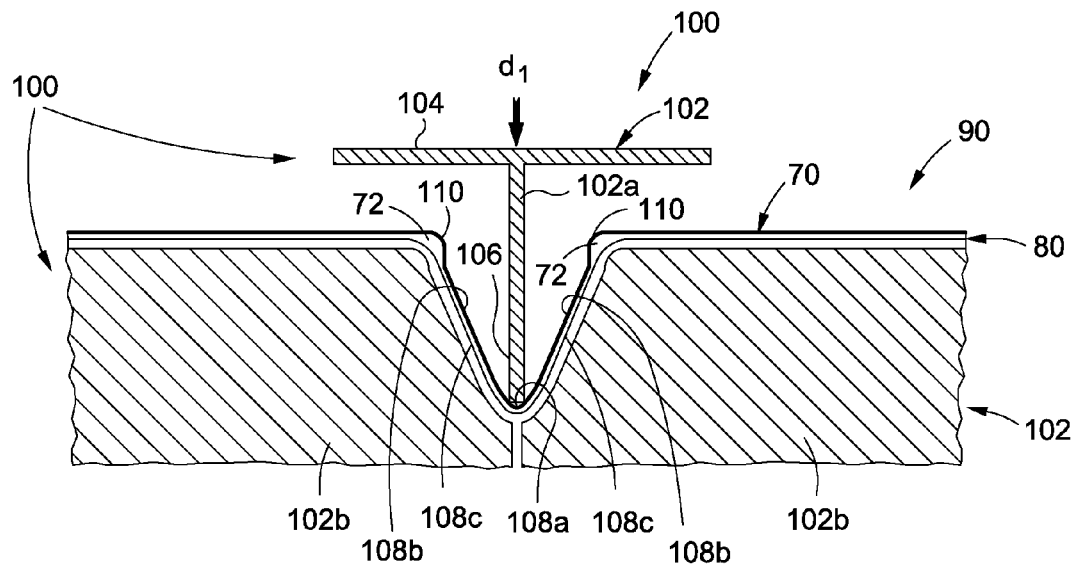
FIG. 5 is an illustration of a front schematic partial sectional view of a layered composite charge that may be used in one of the embodiments of a system and a method of the disclosure and that shows the layered composite charge being folded with a male portion of a shape forming tooling assembly.

As shown in FIGS. 5 and 13, the system 68 further comprises a composite material processing assembly 100 adapted to fold the layered composite charge 90. FIG. 5 is an illustration of a front schematic partial sectional view of the layered composite charge 90 that may be used in one of the embodiments of the system 68 (see FIG. 13) and the method 200 (see FIG. 14) of the disclosure and that shows the layered composite charge 90 being folded with a male portion 102a of a shape forming tooling assembly 102. Preferably, the layered composite charge 90 is heated with a heating device 103 (see FIG. 13) as the layered composite charge 90 is folded by the composite material processing assembly 100.

The composite material processing assembly 100 (see FIGS. 5 and 13) may comprise a shape forming tooling assembly 102 (see FIG. 5), a pultrusion process assembly 142 (see FIG. 13), an extrusion process assembly 144 (see FIG. 13), a press molding assembly 145 (see FIG. 13), or another suitable composite material processing assembly. As shown in FIG. 5, the shape forming tooling assembly 102 may comprise a male portion 102a and a female portion 102b. As further shown in FIG. 5, the male portion 102a may have a T-shaped configuration 104 and a longitudinal portion 106 designed to contact an area 108a of the layered composite charge 90 and exert force against the area 108a in a downward direction $d_1$. As shown in FIG. 5, such downward force exerted by the male portion 102a against area 108a urges areas 108b of the layered composite charge 90 toward the longitudinal portion 106 of the male portion 102a of the shape forming tooling assembly 102 and urges corner portions 110, comprised of the chopped fiber material 72, together and toward the longitudinal portion 106 of the male portion 102a. As shown in FIG. 5, the areas 108c of the layered composite charge 90 are adjacent the female portions 102b of the shape forming tooling assembly 102.

Figure 6:
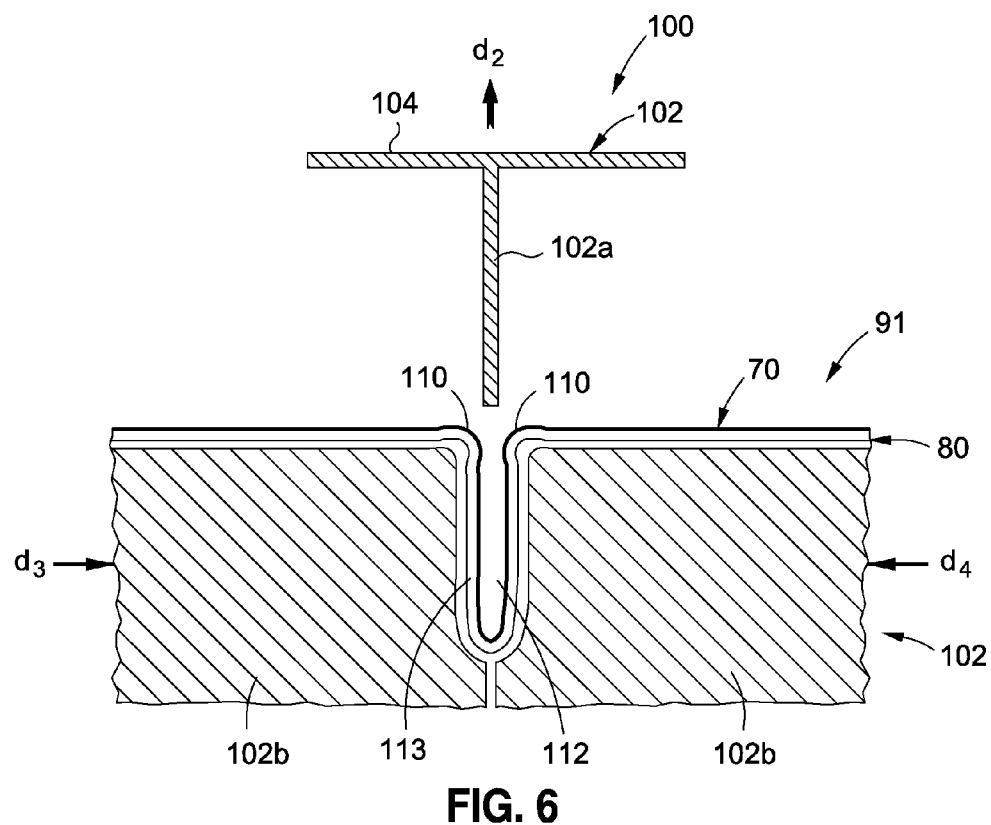
FIG. 6 is an illustration of a front schematic partial sectional view of a folded layered composite charge that may be used in one of the embodiments of a system and a method of the disclosure and that shows a male portion of a shape forming tooling assembly removed after folding.

As shown in FIG. 6, the composite material processing assembly 100, such as in the form of the shape forming tooling assembly 102, creates a folded portion 113 having an interior parting plane portion 112, and forms the folded layered composite charge 91. FIG. 6 is an illustration of a front schematic partial sectional view of the folded layered composite charge 91 that may be used in one of the embodiments of the system 68 (see FIG. 13) and the method 200 (see FIG. 14) of the disclosure and that shows the male portion 102a of the shape forming tooling assembly 102 removed from the folded portion 113 after folding of the layered composite charge 90 to form the folded layered composite charge 91. As shown in FIG. 6, the female portions 102b of the shape forming tooling assembly 102 are urged inwardly in directions $d_3$ and $d_4$ so as to further urge the corner portions 110 together.

Figure 7A:
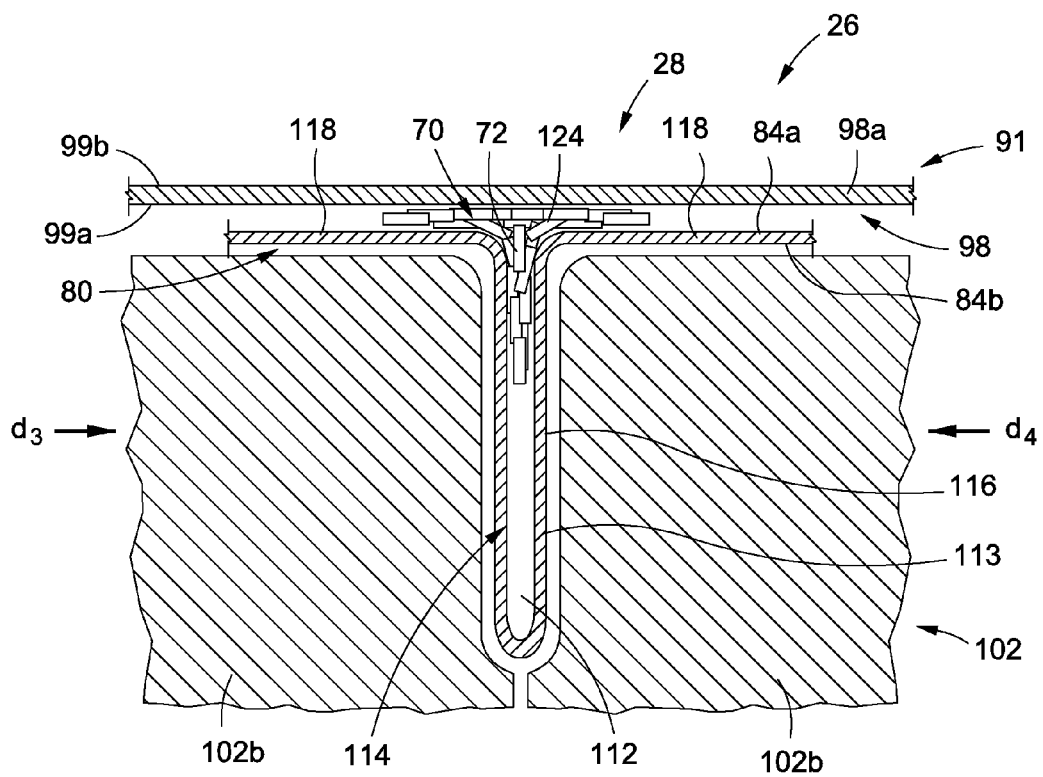
FIG. 7A is an illustration of a front partial sectional view of a folded layered composite charge assembled with a second composite charge to form an embodiment of a composite structure that may be made with one of the embodiments of a system and a method of the disclosure.
Figure 7B:
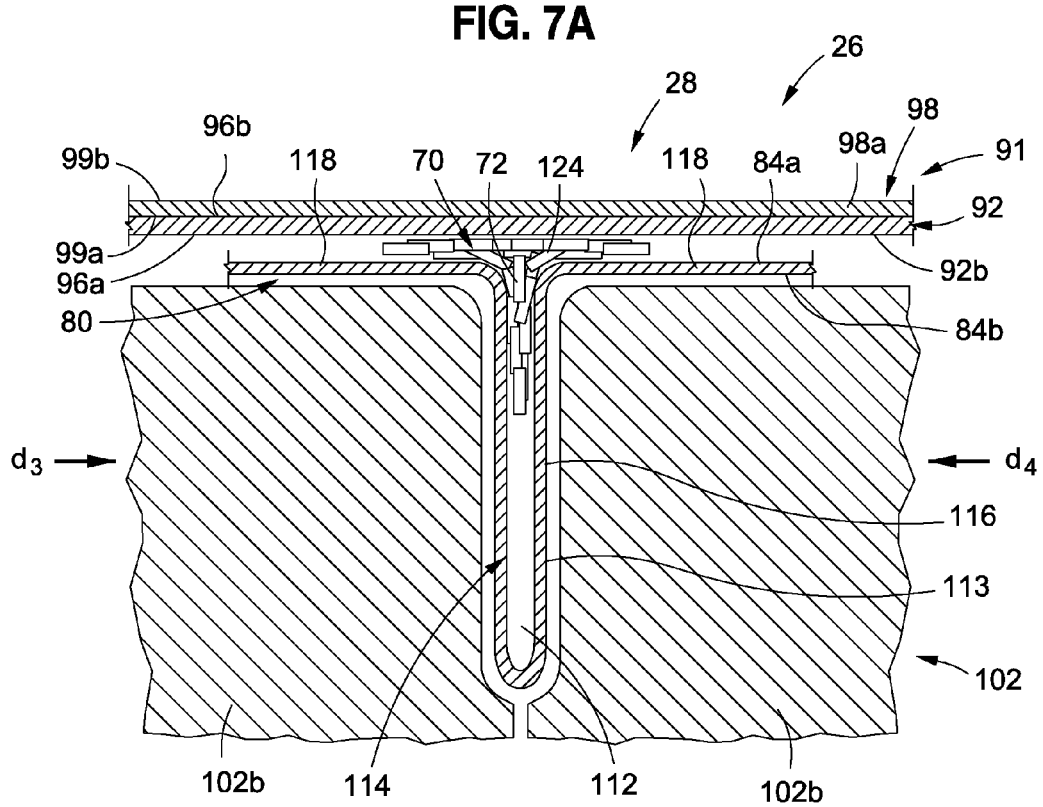
FIG. 7B is an illustration of a front partial sectional view of a folded layered composite charge assembled with a second composite charge and a carrier layer to form another embodiment of a composite structure that may be made with one of the embodiments of a system and a method of the disclosure.

As shown in FIGS. 7A-7B, the system 68 further comprises a second composite charge 98 comprising a plurality of composite plies 82a, such as in the form of a plurality of second stacked composite plies. FIG. 7A is an illustration of a front partial sectional view of the folded layered composite charge 91 assembled with a second composite charge 98 to form an embodiment of the composite structure 26, such as in the form of a stringer 28, that may be made with one of the embodiments of the system 68 (see FIG. 13) and the method 200 (see FIG. 14) of the disclosure. FIG. 7B is an illustration of a front partial sectional view of the folded layered composite charge 91 assembled with the second composite charge 98 and a carrier layer 92, such as in the form of a second carrier layer 92b, to form another embodiment of the composite structure 26 that may be made with one of the embodiments of the system 68 (see FIG. 13) and the method 200 (see FIG. 14) of the disclosure.

As shown in FIGS. 7A-7B, the second composite charge 98 is assembled with the folded layered composite charge 91 to form the composite structure 26, such as in the form of stringer 28. As shown in FIG. 7A, the composite structure 26 comprises a T-section 114 having a folded portion 113, such as in the form of folded web 116, and having flanges 118. The second composite charge 98 comprises a first surface 99a (see FIG. 7A) and a second surface 99b (see FIG. 7A). As shown in FIG. 7A, the first surface 99a of the second composite charge 98 is applied to or attached to the chopped fiber material 72 that forms the gap filler 124 and is further applied or attached to the flanges 118. The female portions 102b of the shape forming tooling assembly 102 are urged inwardly in directions $d_3$ and $d_4$ so as to further urge the chopped fiber material 72 together and accumulate in the gap filler region 122 (see FIG. 8) to form the gap filler 124.

FIG. 7B shows the carrier layer 92, or veil layer, such as in the form of second carrier layer 92b that may be positioned between the second composite charge 98 and the chopped fiber material 72 forming the gap filler 124 of the composite structure 26. In particular, FIG. 7B shows the first surface 96a of the carrier layer 92, such as in the form of second carrier layer 92b, adjacent the chopped fiber material 72 of the chopped fiber gap filler layer 70. FIG. 7B further shows the second surface 96b of the second carrier layer 92b adjacent the first surface 99a of the second composite charge 98. The carrier layer 92, such as in the form of carrier layer 92b, preferably comprises a composite fabric 82c (see FIG. 13), such as a loose carbon fiber woven fabric, that may be used on the interfacing surfaces between the second composite charge 98 and the chopped fiber gap filler layer 70. This allows for a consistent surface transition from the chopped fiber material 72 back to a tape material.

As shown in FIGS. 8 and 9, the system 68 further comprises at least one gap filler 124 formed in the composite structure 26. FIG. 8 is an illustration of a front sectional view of an embodiment of the composite structure 26, such as in the form of stringer 28, that may be made with one of the embodiments of the system 68 (see FIG. 13) and the method 200 (see FIG. 14) of the disclosure. FIG. 9 is an illustration of a perspective view of another embodiment of the composite structure 26, such as in the form of stringer 28, that may be made with one of the embodiments of the system 68 (see FIG. 13) and the method 200 (see FIG. 14) of the disclosure. The composite structure 26 preferably comprises a stringer 28 in an aircraft 10 (see FIG. 1), the first composite charge 80 preferably comprises a stringer charge 80a (see FIG. 13), and the second composite charge 98 preferably comprises a stringer cap charge 98a (see FIG. 13) or a skin panel charge 98b (see FIG. 13).

As shown in FIGS. 8 and 9, the gap filler 124 is preferably in the form of a radius filler 124a or noodle comprised of a sufficient amount of the chopped fiber material 72 to fill the gap filler region 122. As further shown in FIG. 8, the gap filler 124 has radius portions 126 and tip portions 129 (see also FIG. 11). The gap filler 124 is preferably formed of the chopped fiber material 72 and comprises a same material as a material comprising the composite structure 26 surrounding the gap filler 124, or comprises a compatible material with a material comprising the composite structure 26 surrounding the gap filler 124. The gap filler 124 is preferably a quasi-isotropic material 75 (see FIG. 9) and conforms to a shape 133 (see FIG. 9) of the composite structure 26 surrounding the gap filler 124. More preferably, as shown in FIG. 9, the gap filler 124 has radius portions 126 that conform to or substantially match a radial orientation 133a (see FIG. 9) of adjacent stacked continuous fiber pre-preg ply layers 132 of the folded web 116 and flanges 118 of the composite structure 26.

As further shown in FIG. 8, the composite structure 26, such as in the form of stringer 28 and T-section 114, has a flange thickness $t_{flange}$, a web thickness $t_{web}$, and a skin panel thickness $t_{skin\ panel}$. The composite structure 26 shown in FIG. 8 comprises flanges 118 bonded at bonding portions 120a, 120b to the second composite charge 98, such as in the form of skin panel charge 98b. The composite structure 26 shown in FIG. 8 further comprises folded web 116 bonded at bonding portion 120c.

As shown in FIG. 9, the composite structure 26, such as in the form of stringer 28, has a height H1 of the folded web 116, a width W1 of the gap filler 124, such as in the form of radius filler 124a or noodle, and a length L1 of the stacked continuous fiber pre-preg ply layers 132. The composite structure 26 further comprises an opening 131 having discontinuous fibers 74. As shown in FIG. 9, the gap filler 124 comprises chopped fiber material 72 of discontinuous fibers 74 and comprising a quasi-isotropic material 75. The gap filler 124, as shown in FIG. 9, not only includes radius filler 124a or noodle, but also a fold filler 124b comprising the chopped fiber material 72.

As shown in FIG. 9, the system 68 further comprises at least one interlaminar layer 128 formed in the composite structure 26. The interlaminar layer 128 is formed of the chopped fiber material 72. The interlaminar layer 128 (see FIG. 11) preferably minimizes or eliminates formation of resin rich pockets at tip portions 129 (see FIG. 11) of the gap filler 124. As used herein, "resin rich" means an area with an excess amount of resin and containing more than a maximum allowable resin content, and may arise from, for example, improper curing or compaction or the like, and "resin rich" further means an insufficient amount of fiber, as measured by "fiber volume" which may be either by weight or by volume. Given the different forms (random, chopped, tape and fabric) and the different weight properties of fibers (glass, carbon and aramid), the fiber volume values may vary. Generally, testing may determine what fiber volume is best for the fiber form and type. In addition, as used herein, "resin starved" means an excess amount of fiber and an insufficient amount of resin to wet out the reinforcement completely, as measured by fiber volume which may be either by weight or by volume. This lack of bonding may be evidenced by, for example, low gloss, dry spots, or fiber-show. The "resin starved" condition may be caused, for example, by improper wetting or impregnation, or by excessive molding pressure, or the like. In addition, as used herein, "standard fiber to resin ratio" means an acceptable fiber to resin ratio or percentage of fiber to resin content (e.g., volume of fiber to volume of resin, or weight of fiber to weight of resin) that may yield optimal mechanical and physical properties. For example, a standard fiber to resin ratio for composites may fall within a range, such as from 70/30 to 30/70 percent by volume of the product, or may have a starting point or a preferred ratio, such as, for example, 60/40 carbon fiber to resin, or 70/30 fiber to resin for prepreg.

The system 68 further comprises a compression apparatus 160 (see FIG. 13), a platen 134 (see FIG. 13), caul plates 136 (see FIG. 13), a vacuum bag assembly 138 (see FIG. 13) and a curing apparatus 140 (see FIG. 13) for processing the composite structure 26. The curing apparatus 140 may comprise an oven 140a (see FIG. 13), an autoclave 140b (see FIG. 13), or another suitable curing apparatus or device.

FIG. 10A is an illustration of a front sectional view of an embodiment of a J-shaped stringer 146 that may be made with one of the embodiments of the system 68 (see FIG. 13) and the method 200 (see FIG. 14) of the disclosure. FIG. 10A shows the J-shaped stringer 146 having a bended bulb portion 130a and comprising flanges 118, folded web 116, gap filler 124 in the form of radius filler 124a or noodle, and gap filler 124 in the form of fold filler 124b. The J-shaped stringer 146 may be used in aircraft 10 (see FIG. 1) or other suitable vehicles or structures.

FIG. 10B is an illustration of a front sectional view of an embodiment of an I-shaped stringer 148 that may be made with one of the embodiments of the system 68 (see FIG. 13) and the method 200 (see FIG. 14) of the disclosure. FIG. 10B shows the I-shaped stringer 148 having upper and lower flanges 118, folded web 116, and upper and lower gap fillers 124 in the form of radius fillers 124*a* or noodles. The I-shaped stringer 148 may be used in aircraft 10 (see FIG. 1) or other suitable vehicles or structures.

FIG. 10C is an illustration of a front sectional view of an embodiment of a bulb-shaped stringer 150 that may be made with one of the embodiments of the system 68 (see FIG. 13) and the method 200 (see FIG. 14) of the disclosure. FIG. 10C shows the bulb-shaped stringer 150 having a bulb portion 130 and comprising flanges 118, folded web 116, gap filler 124 in the form of radius filler 124*a* or noodle, and gap filler 124 in the form of fold filler 124*b*. The bulb-shaped stringer 150 may be used in aircraft 10 (see FIG. 1) or other suitable vehicles or structures.

Other suitable stringers that may be made with one of the embodiments of the system 68 and the method 200 of the disclosure may include hat stringers, blade stringers, Z-shaped stringers, C-shaped stringers, H-shaped stringers, or other suitable stringer configurations or shapes.

Figure 11:
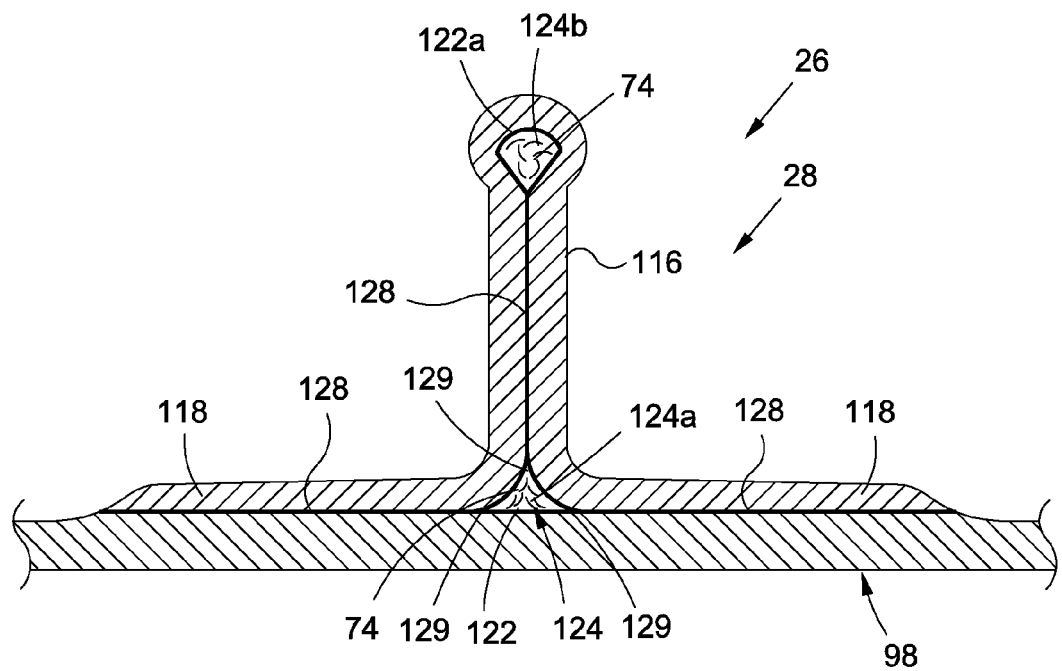
FIG. 11 is an illustration of a front partial sectional view of a bulb-shaped stringer that may be made with one of the embodiments of a system and a method of the disclosure and that shows an interlaminar layer.

FIG. 11 is an illustration of a front partial sectional view of another embodiment of a composite structure 26 in the form of a stringer 28, such as a bulb-shaped stringer, that may be made with one of the embodiments of the system 68 (see FIG. 13) and the method 200 (see FIG. 14) of the disclosure and that shows interlaminer layers 128. As shown in FIG. 11, the stringer 28 comprises flanges 18, folded web 116, gap filler 124 in the form of radius filler 124*a* or noodle, gap filler 124 in the form of fold filler 124*b*, and second composite charge 98. The gap filler 124, in the form of radius filler 124*a* or noodle, comprises discontinuous fibers 74 and tip portions 129. The gap filler 124, in the form of radius filler 124*a*, fills the gap filler region 122. The gap filler 124, in the form of fold filler 124*b*, may also be filled with excess discontinuous fibers 74. The discontinuous fibers 74 may be used to create the interlaminar layers 128 to fill all the gap filler regions 122 or voids. The discontinuous fibers 74 may continue through the interlaminar layers 128 to form a hybrid type of composite structure 26.

Figure 12:
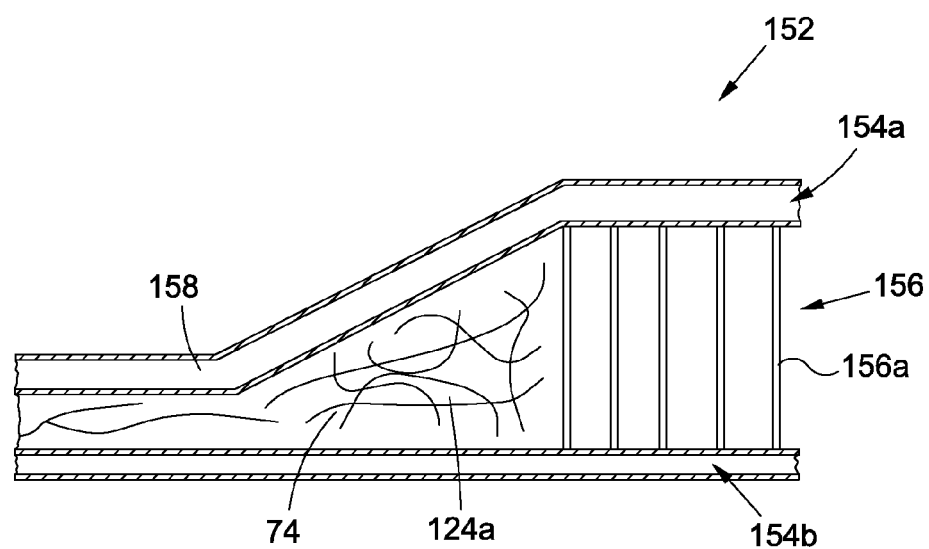
FIG. 12 is an illustration of a front partial sectional view of an embodiment of a sandwich core panel assembly having a radius filler that may be made with one of the embodiments of a system and a method of the disclosure.

FIG. 12 is an illustration of a front partial sectional view of an embodiment of a sandwich core panel composite structure assembly 152 having a radius filler 124*a* or noodle comprised of discontinuous fibers 74 that may be made with one of the embodiments of the system 68 (see FIG. 13) and the method 200 (see FIG. 14) of the disclosure and that may be used with a sandwich core material 156. Preferably, the sandwich core material 156 is in the form of a honeycomb sandwich core material 156*a*. As shown in FIG. 12, the sandwich core panel composite structure assembly 152 further comprises laminates 154*a*, 154*b* on each side of the sandwich core material 156 and on each side of the radius filler 124*a* or noodle. FIG. 12 further shows a disbond location 158 at laminate 154*a* above the radius filler 124*a* or noodle.

The method 200 of making the composite structure 26 (see FIG. 1, FIG. 8 and FIG. 13) having the gap filler 124 (see FIG. 8 and FIG. 13) formed with the chopped fiber material 72 (see FIG. 4A) is shown in FIG. 14. As shown in FIG. 14, the method 200 comprises step 202 of applying chopped fiber material 72 (see FIG. 4A and FIG. 13) in varying thicknesses onto a first ply surface 84*a* (see FIG. 4A) of a first ply 82*b* (see FIG. 13) of a first composite charge 80 (see FIG. 4A and FIG. 13) to form a layered composite charge 90 (see FIG. 4A and FIG. 13). The applying step 202 may preferably comprise steering the chopped fiber material 72 onto the first ply surface 84*a* of the first composite charge 80, such that a substantial number of discontinuous fibers 74 (see FIG. 4B) of the chopped fiber material 72 are steered in a desired fiber orientation 88 (see FIG. 4B and FIG. 13).

The applying step 202 may be performed via a chopped fiber application process 86 (see FIG. 4A and FIG. 13). The chopped fiber application process 86 may comprise an automated application process 86*a* (see FIG. 13), such as an automated application process using a robotic arm, an automated pressurized spraying device, or another suitable device or apparatus, that has the capability of depositing or spraying the chopped fiber material 72 along the length of the first ply surface 84*a* of the first composite charge 80 in varying thicknesses. The chopped fiber application process 86 may further comprise a manual application process 86*b* (see FIG. 13), such as an operator applying the chopped fiber material 72 by hand, with a chopper gun, or via another suitable manually operated device that has the capability of depositing or spraying the chopped fiber material 72 along the length of the first ply surface 84*a* of the first composite charge 80 in varying thicknesses.

The applying step 202 preferably comprises applying a chopped fiber material 72 comprising a chopped carbon fiber pre-preg material onto the first ply surface 84*a* of the first composite charge 80 in at least two mound portions 78 (see FIG. 4A). Each mound portion 78 is preferably of a sufficient thickness to form the gap filler 124 (see FIG. 7A) and to fill a gap filler region 122 (see FIG. 8) of the composite structure 26. The chopped fiber material 72, such as in the form of the chopped carbon fiber pre-preg material, preferably creates a gap filler 124 comprising a quasi-isotropic material 75 (see FIG. 9) that conforms to or substantially matches a radial orientation 133*a* (see FIG. 9) of adjacent stacked continuous fiber pre-preg ply layers 132 of the folded web 116 and flanges 118 of the composite structure 26.

As shown in FIG. 14, the method 200 further comprises step 204 of folding the layered composite charge 90 (see FIG. 5) to form a folded layered composite charge 91. The folding step 204 preferably comprises using a composite material processing assembly 100 (see FIG. 5) to fold the layered composite charge 90 (see FIG. 5). The folding step 204 preferably further comprises heating the layered composite charge 90 with a heating device 103 (see FIG. 13) as the layered composite charge 90 is folded by the composite material processing assembly 100. The composite material processing assembly 100 may comprise a shape forming tooling assembly 102 (see FIG. 5), a pultrusion process assembly 142 (see FIG. 13), an extrusion process assembly 144 (see FIG. 13), a press molding assembly 145 (see FIG. 13), or another suitable composite material processing assembly. As shown in FIG. 5, the shape forming tooling assembly 102 may comprise a male portion 102*a* and a female portion 102*b*. As further shown in FIG. 5, the male portion 102*a* may have a T-shaped configuration 104 and a longitudinal portion 106 designed to contact an area 108*a* of the layered composite charge 90 and exert force against the area 108*a* in a downward direction $d_1$. As shown in FIG. 5, such downward force exerted by the male portion 102*a* against area 108*a* urges areas 108*b* of the layered composite charge 90 against the female portion 102*b* of the shape forming tooling assembly 102 and urges chopped fiber corner portions 110 together and toward the longitudinal portion 106 of the male portion 102*a*. The composite material processing assembly 100, such as in the form of the shape forming tooling assembly 102, creates a folded portion 113 (see FIG. 6) having an interior parting plane portion 112 (see FIG. 6), and forms the folded layered composite charge 91 (see FIG. 6).

As shown in FIG. 14, the method 200 further comprises step 206 of assembling a second composite charge 98 (see FIG. 7A and FIG. 13) and the folded layered composite charge 91 to form a composite structure 26 (see FIG. 7A). The second composite charge 98 and the folded layered composite charge 91 may be pressed together with, for example, a press molding assembly 145 (see FIG. 13) to assemble and join the second composite charge to the folded layered composite charge 91. As shown in FIG. 7A, the chopped fiber material 72 forms a gap filler 124 in the composite structure 26. As shown in FIG. 9, the gap filler 124 preferably conforms to a shape 133 of the composite structure 26 surrounding the gap filler 124. More preferably, as shown in FIG. 9, the gap filler 124 has radius portions 126 that conform to or substantially match a radial orientation 133a (see FIG. 9) of adjacent stacked continuous fiber pre-preg ply layers 132 of the folded web 116 and flanges 118 of the composite structure 26.

The assembling step 206 may further comprise the chopped fiber material 72 forming an interlaminar layer 128 (see FIG. 11) that minimizes or eliminates formation of resin rich pockets at tip portions 129 (see FIG. 11) of the gap filler 124. The chopped fiber material 72 forming the gap filler 124 preferably comprises a same material as a material comprising the composite structure 26 surrounding the gap filler 124, or preferably comprises a material compatible with the material comprising the composite structure 26 surrounding the gap filler 124.

As shown in FIG. 14, the method 200 further comprises step 208 of processing the composite structure 26. As used herein, "processing" generally means forming or manipulating the composite material, such as the layered composite charge 91 and the second composite charge 98, and consolidating the composite material or composite structure 26, which includes curing of the shape or form of the composite material or composite structure 26. Forming or manipulating the composite material may include laying down the chopped fiber material 72 in an advantageous and desired fiber orientation 88 (see FIG. 13) prior to the composite structure 26, such as the stringer 28 (see FIG. 1) being formed. The forming or manipulating may further include preheating a portion of each chopped fiber material 72 so as to stick and hold the portion of each chopped fiber material 72 in the desired fiber orientation 88 (see FIG. 13) while stacking and laying down prior to forming the composite structure 26 such as the stringer 28. Consolidating the composite material involves hardening or toughening of the composite material under heat and/or pressure, and during consolidation, the heat and/or pressure results in flow of resin and wetting of reinforcing fibers of the composite material.

The processing may further comprise removing the composite structure 26 (see FIG. 7A) from the composite material processing assembly 100 and placing it on a platen 134 (see FIG. 13). Caul plates 136 (see FIG. 13) may be installed on the stringer and the entire assembly may in one process embodiment then be vacuum bagged and placed in an autoclave to cure. The processing step 208 may further comprise the step of applying heat and pressure to the composite structure 26 under a vacuum bag assembly 138 (see FIG. 13). The processing step 208 may further comprise the step of curing the composite structure 26 in a curing apparatus 140 (see FIG. 13). The curing apparatus 140 may comprise an oven 140a (see FIG. 13), an autoclave 140b (see FIG. 13), or another suitable curing apparatus or device. The curing apparatus 140 may be implemented using any machine that is capable of curing composite structures. After curing has occurred, the composite structure 26 is removed from the curing apparatus 140.

As shown in FIG. 14, the method 200 may further comprise optional step 210 of applying the chopped fiber material 72 to a carrier layer 92 (see FIG. 4D), such as in the form of a first carrier layer 92a (see FIG. 4D), either before or after a step of positioning the carrier layer 92 on the first ply surface 84a (see FIG. 4D) of the first composite charge 80, or applying the chopped fiber material 72 to the carrier layer 92 in place of the first ply surface 84a and the first composite charge 80. For example, the carrier layer 92 may be positioned on the first ply surface 84a of the first composite charge 80 and then the chopped fiber material 72 may be applied to the carrier layer 92. Alternatively, the chopped fiber material 72 may be applied to the carrier layer 92 at a separate location and then the carrier layer 92 with the chopped fiber material 72 may be positioned on the first ply surface 84a of the first composite charge 80. In another embodiment, the carrier layer 92 may be used in place of or instead of the first composite charge 80, including the first ply surface 84a of the first composite charge 80. The chopped fiber material 72 may be applied to the carrier layer 92 to form a layered carrier layer which may then be folded, assembled with the second composite charge 98 to form the composite structure 26, and then processed.

As shown in FIG. 14, the method 200 may further comprise optional step 212 of applying a carrier layer 92, such as in the form of a second carrier layer 92b (see FIG. 7B), between the second composite charge 98 and the chopped fiber material 72 forming the gap filler 124 of the composite structure 26.

In another embodiment of the disclosure, there is provided a method of making a composite structure 26 (see FIGS. 1, 8) having one or more gap fillers 124 (see FIG. 8) with chopped fiber material 72 (see FIG. 8) and one or more interlaminar layers 128 (see FIG. 11) with chopped fiber material 72. The method comprises the step of applying a chopped fiber gap filler layer 70 (see FIG. 4A) comprising chopped fiber material 72 in varying thicknesses onto a first carrier layer 92a (see FIG. 4D) comprising a composite fabric 82c (see FIG. 13). The method further comprises the step of forming a layered composite charge 90 (see FIG. 4A) by stacking the first carrier layer 92a with a plurality of composite plies 82a (see FIG. 13) to obtain a first composite charge 80 (see FIG. 13), the first carrier layer 92a being positioned between the chopped fiber gap filler layer 70 and the first composite charge 80 (see FIG. 4A). The method further comprises the step of stacking a second carrier layer 92b (see FIG. 7B) comprising a composite fabric 82c (see FIG. 13) with a plurality of composite plies 82a (see FIG. 13) to obtain a second composite charge 98 (see FIG. 13). The method further comprises the step of assembling the layered composite charge 90 and the second composite charge 98 to form a composite structure 26 (see FIG. 7B). The composite structure 26 (see FIG. 1) preferably comprises a stringer composite structure 28 (see FIG. 1) in an aircraft 10 (see FIG. 1). The first composite charge 80 preferably comprises a stringer charge 80a (see FIG. 4B and FIG. 13). The second composite charge 98 preferably comprises a stringer cap charge 98a (see FIG. 7A and FIG. 13) or a skin panel charge 98b (see FIG. 8 and FIG. 13).

The chopped fiber material 72 forms in the composite structure 26 one or more gap fillers 124 and one or more interlaminar layers 128 (see FIG. 11). The chopped fiber material 124 preferably comprises a same material as a material comprising the composite structure 26 or comprises a material compatible with the material comprising the composite structure 26. The method further comprises the step of processing the composite structure 26. The method further comprises applying a chopped fiber gap filler layer 70 onto the second carrier layer 92*b* prior to stacking the second carrier layer 92*b*. The steps of applying the chopped fiber gap filler layer 70 to the first carrier layer 92*a* and to the second carrier layer 92*b* preferably comprise steering the chopped fiber material 72 onto the first carrier layer 92*a* and onto the second carrier layer 92*b*, such that a substantial number of discontinuous fibers 74 (see FIG. 4C) of the chopped fiber material 72 are steered in a desired fiber orientation 88 (see FIG. 4C). The assembling step preferably comprises folding the layered composite charge 90 with a composite material processing assembly 100 (see FIG. 5) and heating the layered composite charge 90 as the layered composite charge 90 is folded by the composite material processing assembly 100.

Disclosed embodiments of the system 68 (see FIG. 13) and the method 200 (see FIG. 14) provide for composite structures 26 (see FIG. 1) having gap fillers 124 and interlaminar layers 128 formed of chopped fiber material 72 where the gap fillers 124, such as in the form of or radius fillers 124*a* or noodles, are created to fill the gap filler region 122 (see FIG. 11) and other voids in the composite structure 26, such as the stringer 28, during formation of the composite structure 26, such as the stringer 28, as opposed to creating a composite structure 26, such as the stringer 28, to fit the gap fillers 124, such as radius fillers 124*a* or noodles. The use of the chopped fiber material 72 to form the one or more gap fillers 124 allows for a more consistent interlaminar interface with a smaller likelihood of human error during assembly.

In addition, disclosed embodiments of the system 68 (see FIG. 13) and the method 200 (see FIG. 14) provide for composite structures 26 (see FIG. 1) having gap fillers 124 and interlaminar layers 128 formed of chopped fiber material 72 which have a design that does not provide an easy path for crack growth since the crack has to spread through a chopped fiber material with inconsistent inter-fiber resin lines, as opposed to known designs of composite structures with gap fillers that allow for crack growth to spread throughout the composite part since the fibers run parallel to the direction of the composite structure, such as the stringer. Further, the chopped fiber material 72 does not allow for straight line crack propagation through the discontinuous fibers 74 similar to what is exhibited on certain known unidirectional fiber radius fillers or noodles.

Moreover, disclosed embodiments of the system 68 (see FIG. 13) and the method 200 (see FIG. 14) provide for composite structures 26 (see FIG. 1) having gap fillers 124 and interlaminar layers 128 formed of chopped fiber material 72 which have a design with improved pull-off strength as compared to known radius filler or noodle designs because the disclosed design eliminates resin rich pockets at the tip portions 129 (see FIG. 11) of the gap filler 124, such as the radius noodle 124*a* or noodle. The consistent interlaminar layer 128 (see FIG. 11) provides for a consistent layer to layer interface throughout the stringer 28 between the stringer charge 80*a* (see FIG. 4B) and the skin panel charge 98*b* (see FIG. 8). The chopped carbon fiber material preferably creates a chopped fiber gap filler layer having variable thickness that does not allow for resin rich pockets to be formed at the tip portions 129 of the gap filler 124. The discontinuous fibers 74 generally contour to direct the load through the gap filler 124 and dispersing the load into the skin panel. Thus, the disclosed design does not allow for weak resin rich pockets to form at the tip portions of the gap filer 124, such as the radius filler 124*a*.

With a sufficiently improved pull-off strength, the stringer 28 may be able to be used as a structural element for the wing rib, and the wing rib may then be fastened to the stringer 28 inside the wing box. This may result in fewer fasteners being used, which may decrease weight of the composite structure, and if the composite structure 26 is used in an aircraft 10 (see FIG. 1), such decrease in weight may result in a decrease in fuel consumption, which, in turn, may result in a decrease in fuel costs. In addition, fewer fasteners may protrude through the wing skin, thus saving time during assembly, aiding in lightening strike protection, and producing fewer fastener holes or areas for fuel leaks.

In addition, disclosed embodiments of the system 68 (see FIG. 13) and the method 200 (see FIG. 14) provide for composite structures 26 (see FIG. 1) having gap fillers 124 and interlaminar layers 128 formed of chopped fiber material 72 that allow for forming the gap filler 124, such as the radius filler 124*a* or noodle, directly on the composite charge or part which eliminates or minimizes the need for storage and transport of the gap filler 124, such as the radius filler 124 or noodle, and which, in turn, may avoid damage to the gap filler 124 that may result from such storage or transport. Further, the manufacture of the gap filler 124, such as the radius filler 124 or noodle, may be less labor intensive than known noodle designs, and the bonding surface may become more consistent since the gap filler 124, such as the radius filler 124 or noodle, conforms to the shape of the composite structure 26, as opposed to the composite structure 26 having to conform to the gap filler 124, such as the radius filler 124 or noodle.

Moreover, disclosed embodiments of the system 68 (see FIG. 13) and the method 200 (see FIG. 14) provide for composite structures 26 (see FIG. 1) having gap fillers 124 and interlaminar layers 128 formed of chopped fiber material 72, where the chopped fiber material 72 creates a quasi-isotropic gap filler 124, such as the radius filler 124*a* or noodle, that generally follows the radial orientation 133*a* of the composite structure 26 from the skin panel charge 98*b* into the stringer charge 80*a*. The chopped fiber material 72 preferably loads the thin flake elements of varying sizes and shapes through the discontinuous fibers 74 (see FIG. 9). In addition, the gap filler 124, such as the radius filler 124*a* or noodle, may be quickly formed through a consistent automated application process 86*a* (see FIG. 13), such as a robotic process. Also by waiting to create the gap filler 124, such as the radius filler 124*a* or noodle, until the stringer 28 is formed, the gap filler 124, such as the radius filler 124*a* or noodle, may fill all present voids, as compared to known noodle designs that may not allow for the fibers to move much during stringer formation. Further, the gap fillers formed of chopped fiber material 72 may be easier to manufacture while also meeting structural criteria of not being too hard or too soft.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of making a composite structure, the method comprising the steps of:
   forming a layered composite charge comprising:
      a first composite charge comprising a plurality of first stacked composite plies and having a first ply surface; and,
      a chopped fiber gap filler layer applied to the first ply surface, the chopped fiber gap filler layer comprising chopped fiber material, and the chopped fiber gap filler layer having varying thicknesses;
   folding the layered composite charge with a composite material processing assembly adapted to fold the layered composite charge;
   assembling a second composite charge and the folded layered composite charge to form a composite structure, the second composite charge comprising a plurality of second stacked composite plies, and the chopped fiber material forming a gap filler in the composite structure, the gap filler formed of the chopped fiber material comprising a same material as, or a compatible material with, a material comprising the composite structure surrounding the gap filler, and the gap filler being quasi-isotropic and conforming to a shape of the composite structure surrounding the gap filler, and the chopped fiber material forming an interlaminar layer formed in the composite structure; and,
   processing the composite structure with a vacuum bag assembly and a curing apparatus.

2. The method of claim 1 wherein the forming step further comprises one of applying the chopped fiber material to a carrier layer before or after a step of positioning the carrier layer on the first ply surface of the first composite charge, or applying the chopped fiber material to the carrier layer in place of the first composite charge including the first ply surface.

3. The method of claim 1 wherein the assembling step further comprises applying a carrier layer between the second composite charge and the gap filler formed of the chopped fiber material.

4. The method of claim 1 wherein the forming step comprises steering the chopped fiber material onto the first ply surface of the first composite charge, such that a substantial number of discontinuous fibers of the chopped fiber material are steered in a desired fiber orientation.

5. The method of claim 1 wherein the forming step is performed via a manual application process or an automated application process.

6. The method of claim 1 wherein the forming step comprises applying a chopped carbon fiber pre-preg material onto the first ply surface of the first composite charge in at least two mound portions each being of a sufficient thickness to form the gap filler and to fill a gap filler region of the composite structure.

7. The method of claim 1 wherein the folding step comprises using the composite material processing assembly to fold the layered composite charge and to heat the layered composite charge as the layered composite charge is folded by the composite material processing assembly.

8. The method of claim 7 wherein the composite material processing assembly comprises one of a shape forming tooling assembly, a pultrusion process assembly, an extrusion process assembly, and a press molding assembly.

9. The method of claim 1 wherein the assembling step comprises the chopped fiber material forming the interlaminar layer that minimizes or eliminates formation of resin rich pockets at tip portions of the gap filler.

10. The method of claim 1 wherein the processing step comprises the steps of:
    applying heat and pressure to the composite structure under the vacuum bag assembly; and,
    curing the composite structure in the curing apparatus.

11. The method of claim 1 wherein the composite structure comprises a stringer composite structure in an aircraft, the first composite charge comprises a stringer charge, and the second composite charge comprises a stringer cap charge or a skin panel charge.

12. A method of making a composite structure having one or more gap fillers and one or more interlaminar layers, the method comprising the steps of:
    applying a chopped fiber gap filler layer comprising chopped fiber material onto a first carrier layer comprising a composite fabric, the chopped fiber gap filler layer having varying thicknesses;
    forming a layered composite charge by stacking the first carrier layer with a plurality of first stacked composite plies to obtain a first composite charge, the first carrier layer being positioned between the chopped fiber gap filler layer and the first composite charge;
    stacking a second carrier layer comprising a composite fabric with a plurality of composite plies to obtain a second composite charge with a plurality of second stacked composite plies;
    assembling the layered composite charge and the second composite charge to form a composite structure and folding the layered composite charge with a composite material processing assembly, the chopped fiber material forming in the composite structure one or more gap fillers and one or more interlaminar layers, the chopped fiber material comprising a same material as a material comprising the composite structure or comprising a material compatible with the material comprising the composite structure; and,
    processing the composite structure with a vacuum bag assembly and a curing apparatus.

13. The method of claim 12 further comprising applying a chopped fiber gap filler layer onto the second carrier layer prior to stacking the second carrier layer.

14. The method of claim 13 wherein applying the chopped fiber gap filler layer to the first carrier layer and to the second carrier layer comprises steering the chopped fiber material onto the first carrier layer and onto the second carrier layer, such that a substantial number of discontinuous fibers of the chopped fiber material are steered in a desired fiber orientation.

15. The method of claim 12 wherein the assembling step further comprises heating the layered composite charge as the layered composite charge is folded by the composite material processing assembly.

16. A system for making a composite structure, the system comprising:
    a layered composite charge comprising:
       a first composite charge comprising a plurality of first stacked composite plies and having a first ply surface; and,
       a chopped fiber gap filler layer applied to the first ply surface, the chopped fiber gap filler layer comprising chopped fiber material, and the chopped fiber gap filler layer having varying thicknesses;

a composite material processing assembly adapted to fold the layered composite charge;

a second composite charge comprising a plurality of second stacked composite plies, the second composite charge being assembled with the folded layered composite charge to form a composite structure;

at least one gap filler formed in the composite structure, the gap filler formed of the chopped fiber material comprising a same material as or a compatible material with a material comprising the composite structure surrounding the gap filler, and the gap filler being quasi-isotropic and conforming to a shape of the composite structure surrounding the gap filler;

at least one interlaminar layer formed in the composite structure, the interlaminar layer formed of the chopped fiber material; and, a vacuum bag assembly and a curing apparatus for processing the composite structure.

17. The system of claim 16 further comprising one or more of, a carrier layer positioned between the chopped fiber gap filler layer and the first composite charge, and a carrier layer positioned between the second composite charge and the chopped fiber material forming the gap filler of the composite structure.

18. The system of claim 16 wherein the composite structure comprises a stringer composite structure in an aircraft, the first composite charge comprises a stringer charge, and the second composite charge comprises a stringer cap charge or a skin panel charge.

19. The system of claim 16 wherein the at least one interlaminar layer minimizes or eliminates formation of resin rich pockets at tip portions of the at least one gap filler.

* * * * *